(12) United States Patent
Hunter et al.

(10) Patent No.: US 9,657,776 B2
(45) Date of Patent: May 23, 2017

(54) BEARINGS

(71) Applicants: Alan Hunter, Nutley, NJ (US); Timothy J. Hagan, Succasunna, NJ (US); Vincent DiMartino, Wayne, NJ (US); Lars-Boris Kuntzler, Krefeld (DE)

(72) Inventors: Alan Hunter, Nutley, NJ (US); Timothy J. Hagan, Succasunna, NJ (US); Vincent DiMartino, Wayne, NJ (US); Lars-Boris Kuntzler, Krefeld (DE)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 837 days.

(21) Appl. No.: 13/929,560

(22) Filed: Jun. 27, 2013

(65) Prior Publication Data

US 2014/0003749 A1 Jan. 2, 2014

Related U.S. Application Data (62) Division of application No. 12/421,299, filed on Apr. 9, 2009, now Pat. No. 8,496,381.

(Continued)

(51) Int. Cl.
*F16C 33/10* (2006.01)
*C10M 119/02* (2006.01)
*C10M 169/02* (2006.01)

(52) U.S. Cl.
CPC .......... *F16C 33/10* (2013.01); *C10M 119/02* (2013.01); *C10M 169/02* (2013.01);
(Continued)

(58) Field of Classification Search
CPC ......... F16C 17/10; F16C 33/20; F16C 33/205
See application file for complete search history.

(56) References Cited

U.S. PATENT DOCUMENTS 1,236,600 A 8/1917 Paul
2,665,956 A 1/1954 Heim
(Continued)

FOREIGN PATENT DOCUMENTS

CN 1262723 A 8/2000
CN 1293173 C 1/2007
(Continued)

OTHER PUBLICATIONS

International Preliminary Report on Patentability dated Oct. 21, 2010 from PCT International Application No. PCT/US2009/040080, 6 pgs.

(Continued)

*Primary Examiner* — Terence Boes
(74) *Attorney, Agent, or Firm* — Chi S. Kim; Abel Law Group, LLP (57) ABSTRACT

A bearing includes a first member having a passageway configured to engage a shaft, the first member having a metallic material; and a second member disposed around at least a portion of the first member, the second member having a metallic material and at least one radially and inwardly bent portion capable of restricting axial movement of the first member. The first and second members are movable relative to each other.

12 Claims, 8 Drawing Sheets

Related U.S. Application Data (60) Provisional application No. 61/043,529, filed on Apr. 9, 2008, provisional application No. 61/043,554, filed on Apr. 9, 2008.

(52) U.S. Cl.
CPC ....... *F16C 33/102* (2013.01); *C10M 2203/10* (2013.01); *C10M 2203/102* (2013.01); *C10M 2203/106* (2013.01); *C10M 2205/028* (2013.01); *C10M 2205/0285* (2013.01); *C10M 2205/166* (2013.01); *C10M 2207/026* (2013.01); *C10M 2207/281* (2013.01); *C10M 2207/285* (2013.01); *C10M 2219/00* (2013.01); *C10N 2220/022* (2013.01); *C10N 2230/10* (2013.01); *C10N 2230/40* (2013.01); *C10N 2240/02* (2013.01); *C10N 2240/20* (2013.01); *C10N 2250/10* (2013.01)

(56) References Cited

U.S. PATENT DOCUMENTS

| | | | |
|---|---|---|---|
| 2,814,538 A * | 11/1957 | Connolly | F16C 11/04 384/206 |
| 2,843,548 A | 7/1958 | Westlund, Jr. et al. | |
| 2,922,682 A | 1/1960 | Abel | |
| 2,995,462 A | 8/1961 | Conrad et al. | |
| 3,162,930 A | 12/1964 | Litsky | |
| 3,642,633 A | 2/1972 | Eckert et al. | |
| 3,883,439 A | 5/1975 | Bergeron | |
| 4,260,205 A | 4/1981 | Spies | |
| 4,304,678 A | 12/1981 | Schick et al. | |
| 4,357,249 A | 11/1982 | Mellor | |
| 4,406,800 A | 9/1983 | Christian | |
| 4,613,712 A | 9/1986 | Bridger | |
| 4,749,502 A | 6/1988 | Alexander et al. | |
| 4,923,624 A | 5/1990 | Albanesi | |
| 5,056,938 A | 10/1991 | Ahlman et al. | |
| 5,209,499 A | 5/1993 | Ruff et al. | |
| 5,219,232 A | 6/1993 | Adams et al. | |
| 5,230,569 A | 7/1993 | Sheedy | |
| 5,398,294 A | 3/1995 | Narkon | |
| 5,401,574 A | 3/1995 | Masutani et al. | |
| 5,558,807 A | 9/1996 | Kim | |
| 5,643,683 A | 7/1997 | Tanaka et al. | |
| 5,851,663 A | 12/1998 | Parsons et al. | |
| 5,939,367 A | 8/1999 | Cuse | |
| 5,998,339 A | 12/1999 | Kato et al. | |
| 6,095,690 A | 8/2000 | Niegel et al. | |
| 6,162,767 A | 12/2000 | Adam | |
| 6,500,787 B1 | 12/2002 | Tanaka et al. | |
| 6,548,188 B1 | 4/2003 | Yanase et al. | |
| 6,689,723 B2 | 2/2004 | Sullivan et al. | |
| 7,053,028 B2 | 5/2006 | Kawamura et al. | |
| 7,360,468 B2 | 4/2008 | Yabe et al. | |
| 7,785,013 B2 | 8/2010 | Egami et al. | |
| 2003/0060375 A1 | 3/2003 | Grainger et al. | |
| 2003/0060376 A1 | 3/2003 | Hirata et al. | |
| 2003/0069147 A1 | 4/2003 | Kawamura et al. | |
| 2003/0179966 A1 | 9/2003 | Hojo | |
| 2004/0258335 A1 | 12/2004 | Shimizu et al. | |
| 2005/0196082 A1 | 9/2005 | Asfour et al. | |
| 2006/0002643 A1 | 1/2006 | Aubele | |
| 2006/0003904 A1 | 1/2006 | Maeda et al. | |
| 2006/0030500 A1 | 2/2006 | Ota et al. | |
| 2006/0175123 A1 | 8/2006 | Yabe et al. | |
| 2007/0000807 A1 | 1/2007 | Wu et al. | |
| 2007/0021544 A1 | 1/2007 | Yanase et al. | |
| 2007/0155633 A1 | 7/2007 | Nalesnik | |
| 2008/0161214 A1 | 7/2008 | Asakura et al. | |
| 2009/0257694 A1 | 10/2009 | Hunter et al. | |
| 2009/0258802 A1 | 10/2009 | Hagan et al. | |

FOREIGN PATENT DOCUMENTS

| | | |
|---|---|---|
| CN | 1957185 A | 5/2007 |
| EP | 0381336 A1 | 8/1990 |
| EP | 0521645 | 1/1993 |
| EP | 0570625 A2 | 11/1993 |
| EP | 0631060 | 12/1994 |
| EP | 1305530 | 5/2003 |
| EP | 1 803 792 A1 | 7/2007 |
| FR | 1411324 A | 9/1965 |
| GB | 567905 | 3/1945 |
| GB | 731348 A | 6/1955 |
| JP | 55006005 A | 1/1980 |
| JP | 55072917 A | 6/1980 |
| JP | 56149484 A | 11/1981 |
| JP | 56150623 A | 11/1981 |
| JP | 59047517 A | 3/1984 |
| JP | 60-031598 | 2/1985 |
| JP | 02-046315 A | 2/1990 |
| JP | 09-194867 | 7/1997 |
| JP | 10213129 A | 8/1998 |
| JP | 2001-090729 | 4/2001 |
| JP | 2003-003185 | 1/2003 |
| JP | 2003021144 A | 1/2003 |
| JP | 2003699960 A | 1/2003 |
| JP | 2005163957 A | 6/2005 |
| RU | 2290416 C2 | 12/2006 |
| WO | 89/06681 A1 | 7/1989 |
| WO | 9703152 A1 | 1/1997 |
| WO | 97/28379 A2 | 8/1997 |
| WO | 9902873 A1 | 1/1999 |
| WO | 2004/040155 A | 5/2004 |
| WO | 2005007741 A1 | 1/2005 |
| WO | 2008013697 A2 | 1/2008 |

OTHER PUBLICATIONS

International Search Report and Written Opinion dated Nov. 23, 2009 issued in corresponding PCT Application No. PCT/US/2009/040071, 12 pages.
ExxonMobile, 48133-60 Mobile 1 0W-40 Material Safety Data Bulletin, Apr. 11, 2002, 8 pages, CRC Press.
NLGI, Lubricating Grease Guide, 2006, 10 pages, Fifth Edition, Library of Congress Catalog Card No. 84-61641.
Kirk-Othmer, Lubrication and Lubricants, Encyclopedia of Polymer Science and Technology, vol. 15, 6 pages.
Nachi, Nachi Technical Center, Lubrication, downloaded from the Internet Jan. 8, 2010, 9 pages.
E. Richard Booser, Tribology Data Handbook, an Excellent Friction, Lubrication and Wear Resource, 1997, 4 pages.
Written Opinion of the International Searching Authority dated Jul. 31, 2009 issued in corresponding PCT International Application No. PCT/US2009/040080, 8 pages.
Tribology & Lubrication Technology Systems, Strategies & Research for Lubrication Professionals, 32 pgs.
International Search Report dated Nov. 23, 2009 issued in PCT Application No. PCT/US2009/010071, 1 pg.
International Search Report dated Jul. 31, 2009 issued in corresponding PCT Application No. PCT/US2009/040080, 1 pg.

\* cited by examiner

BEARINGS

CROSS-REFERENCE TO RELATED APPLICATION(S)

The present application is a divisional of and claims priority to U.S. Non-provisional patent application Ser. No. 12/421,299, filed Apr. 9, 2009, entitled "BEARINGS," naming inventors Alan Hunter, Timothy J. Hagan, Vincent DiMartino, and Lars-Boris Kuntzler, which application claims priority to U.S. Provisional Patent Application No. 61/043,529, filed Apr. 9, 2008, entitled "BEARINGS," naming inventors Alan Hunter, Timothy J. Hagan, Vincent DiMartino, and Lars-Boris Kuntzler, and claims priority to U.S. Provisional Patent Application No. 61/043,554, filed Apr. 9, 2008, entitled "BEARING GREASE COMPOSITION," naming inventors Timothy J. Hagan and Vincent DiMartino, of which all three applications are incorporated by reference herein in their entirety.

TECHNICAL FIELD

The invention relates to bearings and, in particular, to self-lubricating bearings.

BACKGROUND

Bearings can provide convenient means for rotatably, pivotably or slidably fastening multiple members to one another in a low maintenance manner. Applications for bearings include those that have continuous rotational movement, such as journals for supporting a driven shaft. Bearings can also be used for applications that have repeated pivotal movement, such as automotive door hinges, door checks, brake and accelerator pedals. Additional applications include those that have repeated reciprocal movement, such as automotive shock absorbers and struts. Bearings can also be used in lighter duty applications, such as multiple bar linkages used in the automotive industry for trunk deck lid and hood hinges. Low maintenance bearings can include a variety of configurations, such as, for example, bushes or journal bearings, thrust bearings or washers, locating pads, valve port plates, and wearing components for a variety of mechanisms. An example of a low maintenance a sliding bearing includes a metal support and a plastic layer.

SUMMARY

In one aspect, the invention features bearings, related methods, and systems including the bearings. The bearings can be used in a variety of high speed applications including high speed motors. The bearings may provide reduced motor vibrations, which can result in quieter motor operation and increased motor life.

In one aspect, the invention features a bearing comprising an inner ring having a passageway configured to engage a shaft, the inner ring having an inner surface and an outer surface, an outer ring disposed around at least a portion of the inner ring, the outer ring having an inner surface and an outer surface, the outer ring comprising a polymer and forming a bearing surface at an interface with the inner ring wherein the inner surface of the outer ring has a radius that is greater at the midline of the outer ring than at the lateral edges of the outer ring; and a hollow cylindrical ring surrounding and fixed to the outer ring wherein the inner ring is rotatable in relation to the hollow cylindrical ring.

In another aspect, the invention features a bearing, including a first member having a passageway configured to engage a shaft, the first member including a metallic material; and a second member disposed around at least a portion of the first member, the second member including a polymer and at least one radially and inwardly bent portion capable of restricting axial movement of the first member. The first and second members are movable relative to each other.

Embodiments may include one or more of the following features. The first member consists essentially of a metallic material. The bearing further includes a lubricant between the first member and the second member. At least one of the first member or the second member includes a cavity containing the lubricant. The second member further includes a polymer. The first member includes a groove extending along a circumferential portion of the first member, and the second member includes a feature configured to engage with the groove and prevent axial movement of the first and second members relative to each other. The bearing further includes a third member disposed around at least a portion of the second member, the third member including a metallic material. The third member includes at least one radially and inwardly bent portion capable of restricting axial movement of the first member.

In another aspect, the invention features a bearing including a first member having a passageway configured to engage a shaft, the first member consisting essentially of a metallic material; a second member disposed around at least a portion of the first member, the second member comprising a polymer and at least one radially and inwardly bent portion capable of restricting axial movement of the first member, wherein the first and second members are movable relative to each other; and a third member disposed around at least a portion of the second member, the third member including a metallic material and at least one radially and inwardly bent portion capable of restricting axial movement of the first member.

Embodiments may include one or more of the following features. The second member includes a first layer including the metallic material, and a second layer including a polymer. The bearing further includes a lubricant between the first and second members.

In another aspect, the invention features a method including engaging the passageway of a bearing described herein with a shaft of a motor, and moving the shaft, wherein a first member of the bearing moves with the shaft and relative to a second member of the bearing.

In another aspect, the invention features a system, including a movable shaft; and a hearing including a first member having a passageway configured to engage a shaft, the first member including a metallic material; and a second member disposed around at least a portion of the first member, the second member including a polymer and at least one radially and inwardly bent portion capable of restricting axial movement of the first member. The first and second members are movable relative to each other.

Embodiments may include one or more of the following features. The first member consists essentially of a metallic material. The system further includes a lubricant between the first member and the second member. At least one of the first member or the second member includes a cavity containing the lubricant. The second member further includes a polymer. The first member may include a groove extending along a circumferential portion of the first member, and the second member includes a feature configured to engage with the groove and prevent axial movement of the first and second members relative to each other. The system further includes a third member disposed around at least a portion of the second member, the third member including a metallic material. The third member includes at least one radially and inwardly bent portion capable of restricting axial movement of the first member. The system includes a motor having the shaft, and wherein the shaft is rotatable about its long axis.

Other aspects, features and advantages will be apparent from the description of the embodiments thereof and from the claims.

DETAILED DESCRIPTION

Figure 1:
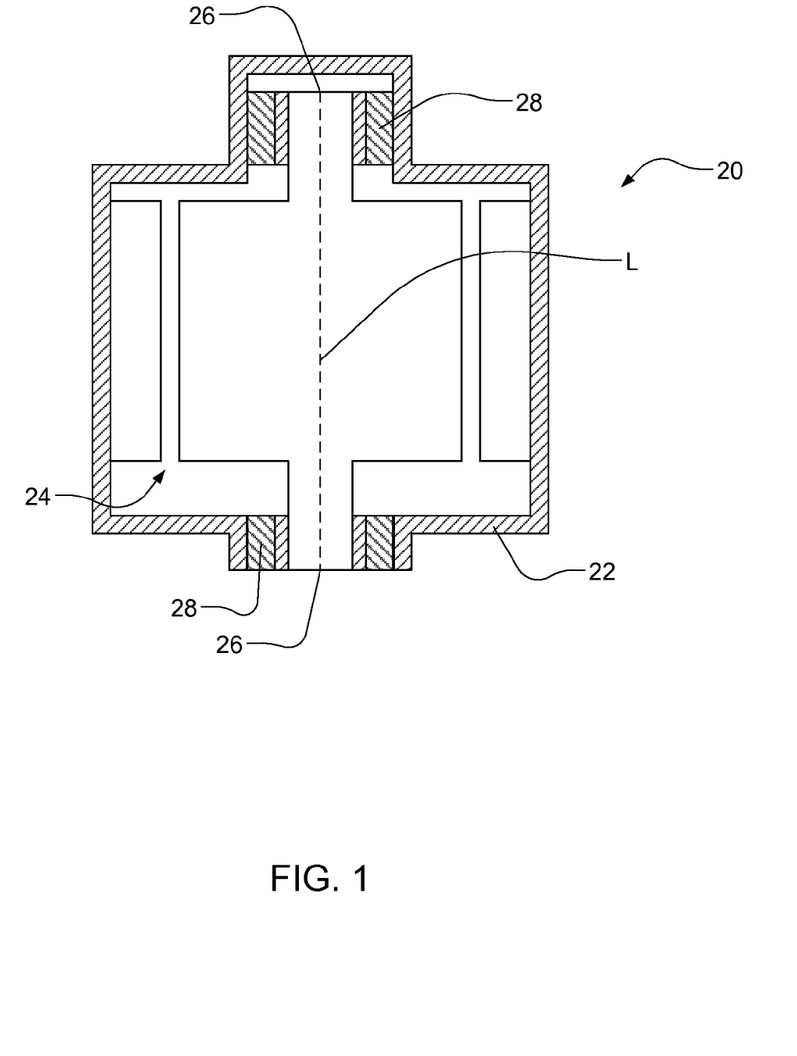
FIG. 1 is a schematic diagram of a system including a motor and a bearing.

Referring to FIG. 1, a system 20 includes a housing 22, a motor 24 having a rotor 26, at least a portion of which is in the housing, and bearing 28 in the housing. Rotor 26 includes a shaft capable of rotating about its longitudinal axis L, and bearing 28 is positioned between the rotor and the housing. Bearing 28 is capable of reducing motor vibrations, which can result in quieter motor operation and increased motor life. In some embodiments, bearing 28 is used to replace bushings and ball bearings in electric motors, e.g., high speed motors operating at approximately 1,000-6,000, RPM or more and under loads of approximately 0-300, pounds.

Figure 2:
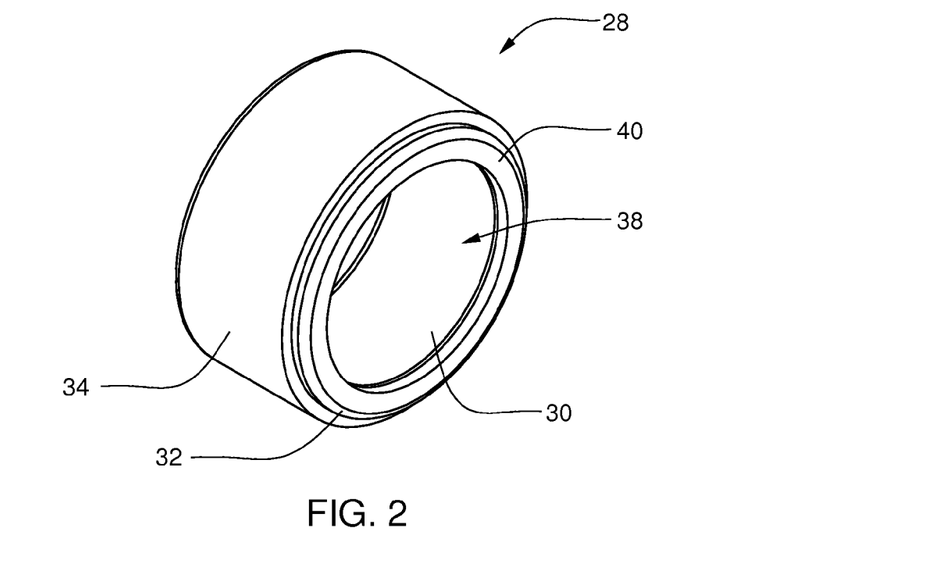
FIG. 2 is a perspective view of an embodiment of a bearing.
Figure 3:
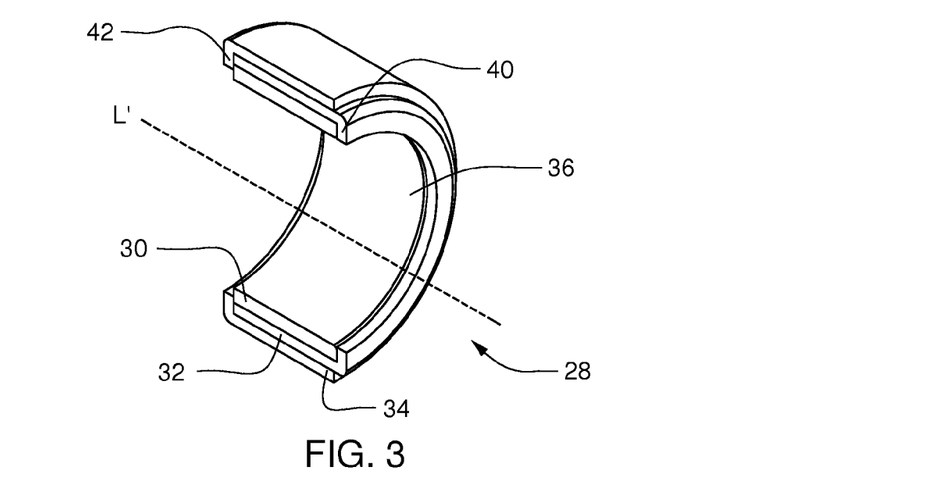
FIG. 3 is a perspective, cut-away view of the bearing shown in FIG. 2.

As shown in FIGS. 2 and 3, bearing 28 includes an assembly of three parts: a first member (as shown, a cylinder 30), a second member (as shown, a first flanged cylinder 32) surrounding the first member, and a third member (as shown, a second flanged cylinder 34 although this member can also be an unflanged cylinder that surrounds double flanged cylinder 32) surrounding the second member. As shown, cylinder 30 is a solid and continuous member having an inner surface 36 and an outer surface Inner surface 36 defines a passageway 38 that extends along the longitudinal axis L' of cylinder 30 (and bearing 28). The shape and size of passageway 38 are configured to allow cylinder 30 to be engaged with (e.g., pressed on to) rotor 26, resulting in an interference fit. During operation of motor 24, as rotor 26 rotates about its longitudinal axis L, cylinder 30 rotates along with the rotor as a result of the interference fit. The outer surface of cylinder 30 defines a cylindrical surface. Cylinder 30 can include (e.g., be formed of) any material including a metal, e.g., a pure metal (such as aluminum and magnesium) or an alloy (such as hardened steel), or a hard plastic. Cylinder 30 can be formed, for example, by machining, forming from a strip, and/or extrusion.

First flanged cylinder 32 provides a bearing surface for cylinder 30 as cylinder 30 rotates during operation of motor 24. As shown, first flanged cylinder 32 extends along the length of cylinder 30 and surrounds at least a portion of the outer surface of cylinder 30. First flanged cylinder 32 has an inner surface and an outer surface, both of which define cylindrical surfaces. The inner surface of first flanged cylinder 32 is in circumferentially sliding engagement with the outer surface of cylinder 30. In some embodiments, the clearance between the inner surface of first flanged cylinder 32 and the outer surface of cylinder 30 is typically approximately 0.0005-0.003, inch (0.01~0.076, mm) As a result, during operation of motor 24, cylinder 30 rotates along with rotor 26, but first flanged cylinder 32 remains stationary. Still referring to FIG. 2, at a first end, first flanged cylinder 32 is flushed with an end of cylinder 30, and at an opposite second end, the first flanged cylinder includes a flange 40 configured to restrict axial movement of cylinder 30. As shown, flange 40 is a radially and inwardly bent portion that extends along the thickness of cylinder 30 but does not extend into passageway 38. The clearance between flange 40 and an end wall of cylinder 30 can be approximately 0.005-0.010, inch (0.127~0.254, mm) First flanged cylinder 32 can include (e.g., be formed of) any bearing material including a metal, e.g., a pure metal (such as aluminum and magnesium), an alloy (such as hardened steel), or a composite (e.g., Norglide Pro® material having a steel or aluminum substrate and a PTFE layer laminated to the substrate). Other maintenance free bearing materials, e.g. NORGLIDE® M, SM or T, can be used. First flanged cylinder 32 can be formed, for example, by rolling a strip of material and flanging the roll by conventional techniques.

Second flanged cylinder 34 is configured to hold cylinder 30 and first flanged cylinder 32 within housing 22. As shown, second flanged cylinder 34 extends along the length of first flanged cylinder 32 and surrounds at least a portion of the outer surface of first flanged cylinder 32. First flanged cylinder 32 has an inner surface and an outer surface, both of which define cylindrical surfaces. At a first end, second flanged cylinder 34 is flush with an end of cylinder 30, and at a second opposite end, the second flanged cylinder includes a flange 42 configured to restrict axial movement of cylinder 30. The clearance between flange 42 and an end wall of cylinder 30 can be approximately 0, to 0.01, inch (0~0.254, mm). As shown, flange 42 is a radially and inwardly bent portion that extends along the thickness of first flanged cylinder 32 and cylinder 30 but does not extend into passageway 38. Second flanged cylinder 34 can include (e.g., be formed of) any hard material including a metal, e.g., a pure metal (such as aluminum and magnesium) or an alloy (such as hardened steel). Second flanged cylinder 34 can be formed, for example, by rolling a strip of material and flanging the roll by conventional techniques.

Bearing 28 can be formed by forming the three parts described above (cylinder 30, first flanged cylinder 32, and second flanged cylinder 34) and assembling the parts together. For example, cylinder 30 can be slid into first flanged cylinder 32, and these two parts can be slid into second flanged cylinder 34 to form bearing 28. Axial movement of cylinder 30 is restricted by first and second flanged cylinder 32, 34.

In use, bearing 28 can be placed in a housing or a space configured to receive the bearing, and a member (e.g., a shaft of a motor) can be placed in engagement with passageway 38 of the bearing. When the member moves (e.g., rotates), cylinder 30 of bearing 28 moves with the member and bears against first flanged cylinder 32.

While a number of embodiments have been described, the invention is not so limited.

For example, while passageway 38 is shown above has having a circular cross section, in other embodiments, the passageway has a non-circular cross section, such as oval, elliptical, regularly or irregularly polygonal having three, four, five, six, seven, eight or more sides. The member (e.g., rotating shaft) configured to engage with passageway 38 would have a cross section with a correspondingly matching outer contour to provide the interference fit or engagement for operation, as described herein.

As another example, in some embodiments, the wall(s) of first and/or second flanged cylinders 32, 34 include a slit or a gap extending parallel to longitudinal axis L'. After the parts of the bearing are assembled, the opposing parts of the slit can be joined together (e.g., by welding or by interlocking features) or remained spaced.

Figure 4:
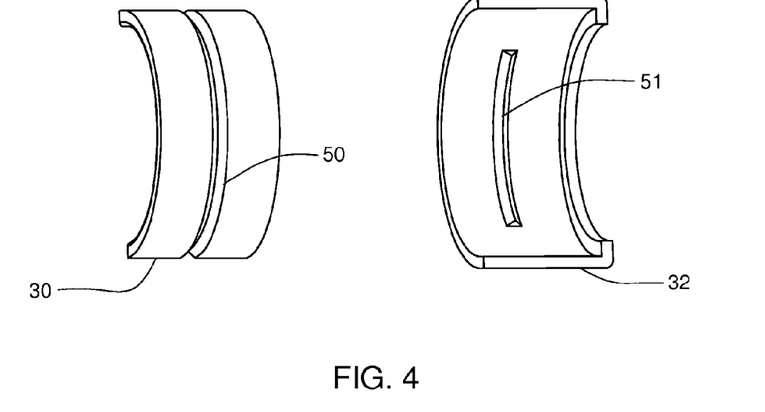
FIG. 4 is a perspective view of a portion of an embodiment of a bearing.

Referring to FIG. 4, to further reduce axial movement of the parts, cylinder 30 can include one or more grooves 50 extending wholly or partially about its outer circumferential surface, and first flanged cylinder 32 can include one or more complementary features 51 (e.g., a raised segment) configured to engage with the groove. Similarly, the outer surface of first flanged cylinder 32 and the inner surface of second flanged cylinder 34 can include similar complementary features to prevent axial movement of these parts.

In some embodiments, the bearings described herein are used in applications in which a pivotable member (e.g., a shaft) is placed in the passageway of the bearings.

Figure 5:
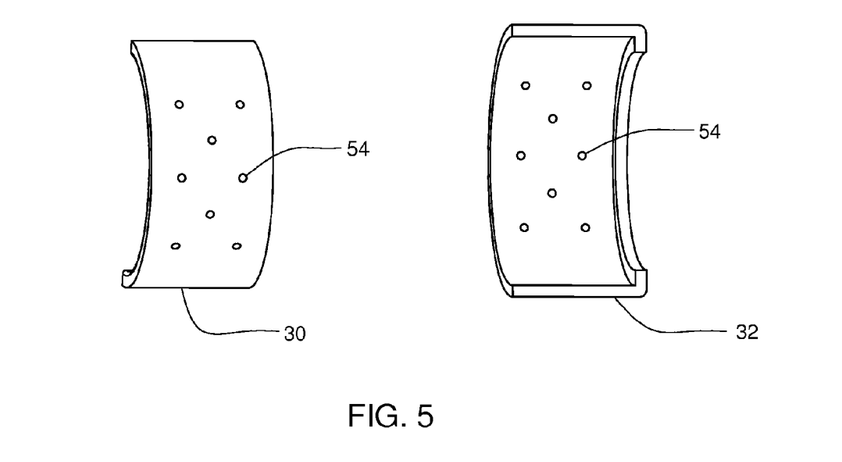
FIG. 5 is a perspective view of a portion of an embodiment of a bearing.

In some embodiments, the bearings described herein include one or more lubricants or lubricious layers between cylinder 30 and first flanged cylinder 32. The lubricant or lubricious layer can enhance the wear resistance of the bearings. Examples of materials included in the lubricant or lubricious layer include solid state materials (e.g., inorganic materials such as graphite and/or molybdenum disulfide), viscous fluids (e.g., grease), polymers (e.g., fluoropolymers (such as PTFE) and/or silicone), and combinations thereof. Referring to FIG. 5, the outer surface of cylinder 30 and/or the inner surface of first flanged cylinder 32 can include one or more cavities 54 (e.g., pockets and/or grooves) that serve as reservoirs for the lubricant.

One or more additives can be included in the lubricant or lubricious layer, for example, to enhance thermal conductivity and to dissipate heat that can be generated during use. An example of an additive is metal particles, e.g., bronze particles.

The bearing members can include one or more intermediate layers between metallic and polymer layers. The intermediate layer can, for example, enhance adhesion or bonding of the polymer to the metallic substrate. The intermediate layer can include, for example, an adhesive such as fluoropolymers including PFA, MFA, ETFE, FEP, PCTFE, and PVDF, curing adhesives such as epoxy, polyimide adhesives, and lower temperature hot melts such as ethylene vinylacetate (EVA) and polyether/polyamide copolymer (Pebax®).

Figure 6:
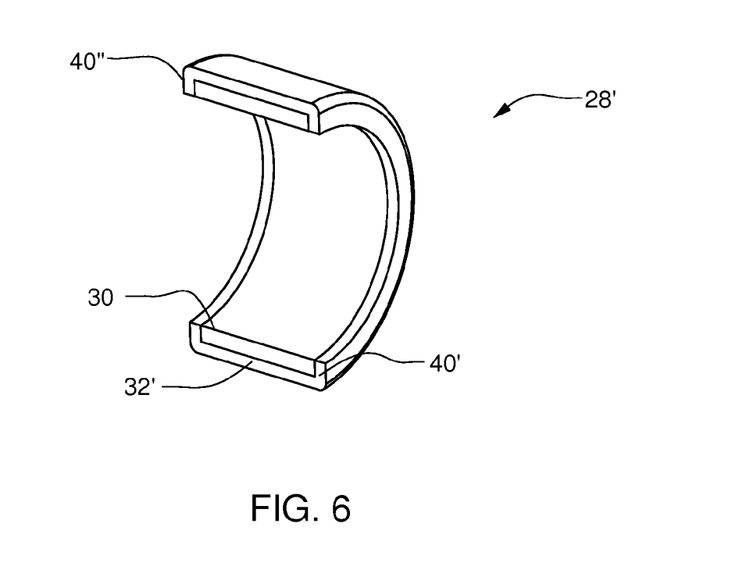
FIG. 6 is a perspective, cut-away view of an embodiment of a bearing.

While bearing 28 as shown in FIGS. 2 and 3 includes three components, in other embodiments, the bearing includes two components or more than three components. FIG. 6 shows an exemplary two-component bearing 28' including a first member (as shown, cylinder 30) and a second member (as shown, first flanged cylinder 32') surrounding the first member. At its ends, first flanged cylinder 32' includes a first flange 40' and a second flange 40" configured to restrict axial movement of cylinder 30. Flanged cylinder 32' may be a split cylinder that includes two ends that may be joined, for example, by welding, by adhesive bonding, with a connector, or through interlocking tabs and slots. The materials used to fabricate bearing 28', as well as the clearances between the components, can be the same as described above for bearing 28. Bearing 28' can include one or more of the features described above (e.g., different cross-sectional shapes, lubricants, additional layers, grooves). Bearing 28' may optionally include a third component that surrounds the circumference of double flanged cylinder 32'. This third component may be void of flanges and may help to stabilize the bearing and keep it in round. The third component may be metallic and/or polymeric and may be shaped and sized to fit a specific housing or other application. It may be cylindrical or other shape such as a regular polygon. The inner surface of the third component may present a different shape than the outer surface. It may be friction fit or adhered to flanged cylinder 32'.

Figure 7:
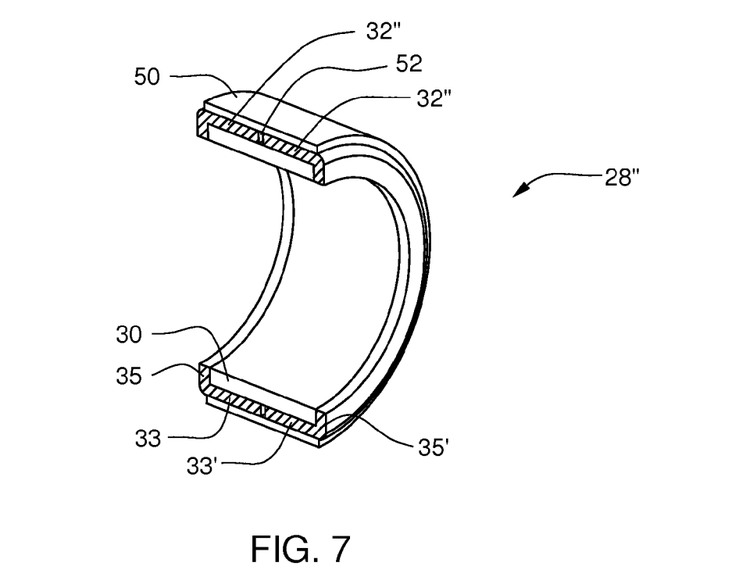
FIG. 7 is a perspective, cut-away view of an embodiment of a bearing.

As another example, FIG. 7 shows a bearing 28" including a first member (as shown, cylinder 30), a two-component second member (as shown, first flanged cylinder 32") surrounding the first member, and a third member (as shown, cylinder 50) surrounding the second member. Flanged cylinder 32" includes two parts 33, 33' that, respectively, have flanges 35, 35' configured to restrict axial movement of cylinder 30. Parts 33, 33' may be in axial contact with each other or may be axially spaced from each other to define a gap 52, for example, approximately 0.002, inch (0.05, mm) to approximately 0.010, inch (0.254, mm) long. As shown, cylinder 50 is a continuous cylinder with no flanges and can be formed of, for example, steel or aluminum. It is believed that cylinder 50 provides bearing 28" with stiffness and consistent clearances between the components of the bearing. The materials used to fabricate bearing 28", as well as the clearances between the components, can be the same as described above for bearing 28.

Figure 8:
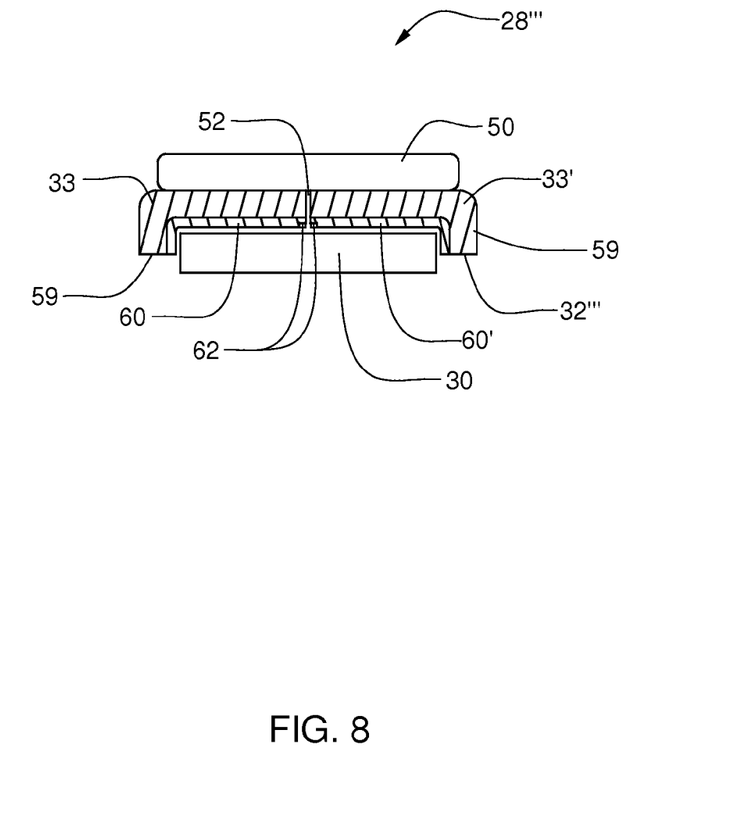
FIG. 8 is a detailed, cross-sectional view of an embodiment of a bearing.

Bearing 28" can include one or more of the features described above (e.g., different cross-sectional shapes, lubricants, additional layers, grooves). For example, FIG. 8 shows a bearing 28''' including first member cylinder 30, first flanged cylinder 32" (second member) surrounding the first member, and cylinder 50 surrounding the second member. First flanged cylinder 32" includes two symmetrical halves 33 and 33'. As shown, first flanged cylinder 32" includes a metal substrate 59 and a polymer layer 60 on the metal substrate. Examples of materials for first flanged cylinder 32" include a metal substrate (e.g., a steel or aluminum substrate) and a polymer layer (e.g., a PTFE layer) laminated to the substrate (e.g. NORGLIDE® M, SM T, Pro®). In some embodiments, bearing 28''' includes a lubricant between cylinder 30 and first flanged cylinder 32", and as shown the first flanged cylinder includes a cavity 62 in polymer layer 60 near gap 52 to help retain the lubricant. Cavity 62 in polymer layer 60 may be present with or without gap 52. One specific example of an appropriate lubricant is a lubricant composition including (by volume) 62% Mobil 1® 0W-40 motor oil, 19% Bakoda® ski wax and 19% Lucas® Heavy Duty Oil Stabilizer. Examples of additional lubricants are described in the patent application titled BEARING GREASE COMPOSITION, U.S. patent application Ser. No. 12/421,395, filed on even date herewith and which is hereby incorporated by reference herein. In other embodiments, bearing 28''' does not include the lubricant and/or cavity 62.

Other embodiments may include four or more components. An exemplary bearing having more than three components can include a first member (e.g., cylinder 30), a second member (e.g., first flanged cylinder 32) surrounding the first member, a third member (e.g., second flanged cylinder 34) surrounding the second member, and additional members (e.g., one, two, three or more) surrounding the third member. The additional members can surround the more radially inward members similarly to how the second member or the third member surrounds more radially inward member(s).

Figure 9:
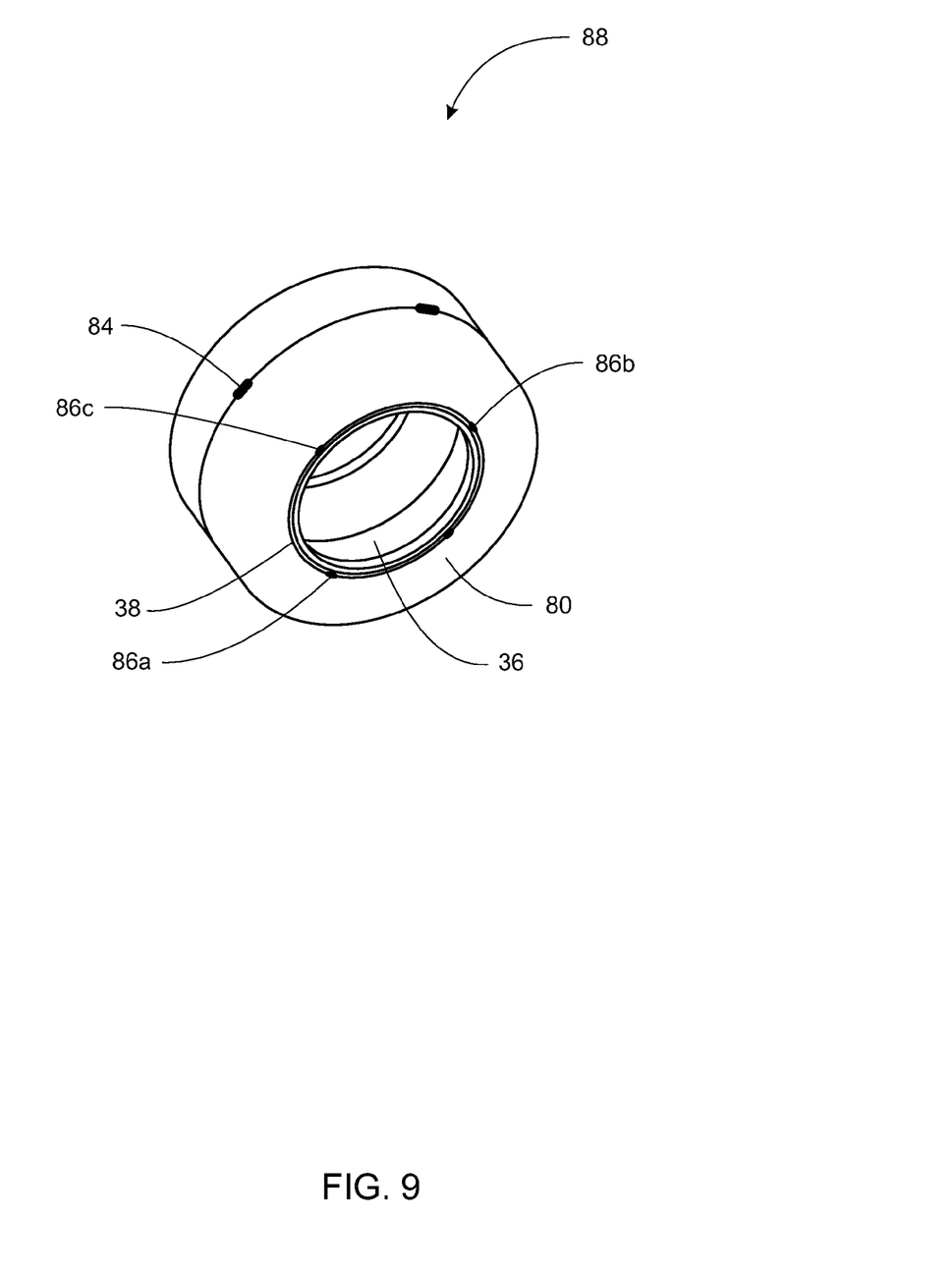
FIG. 9 is an isometric view of an embodiment of a bearing.
Figure 10:
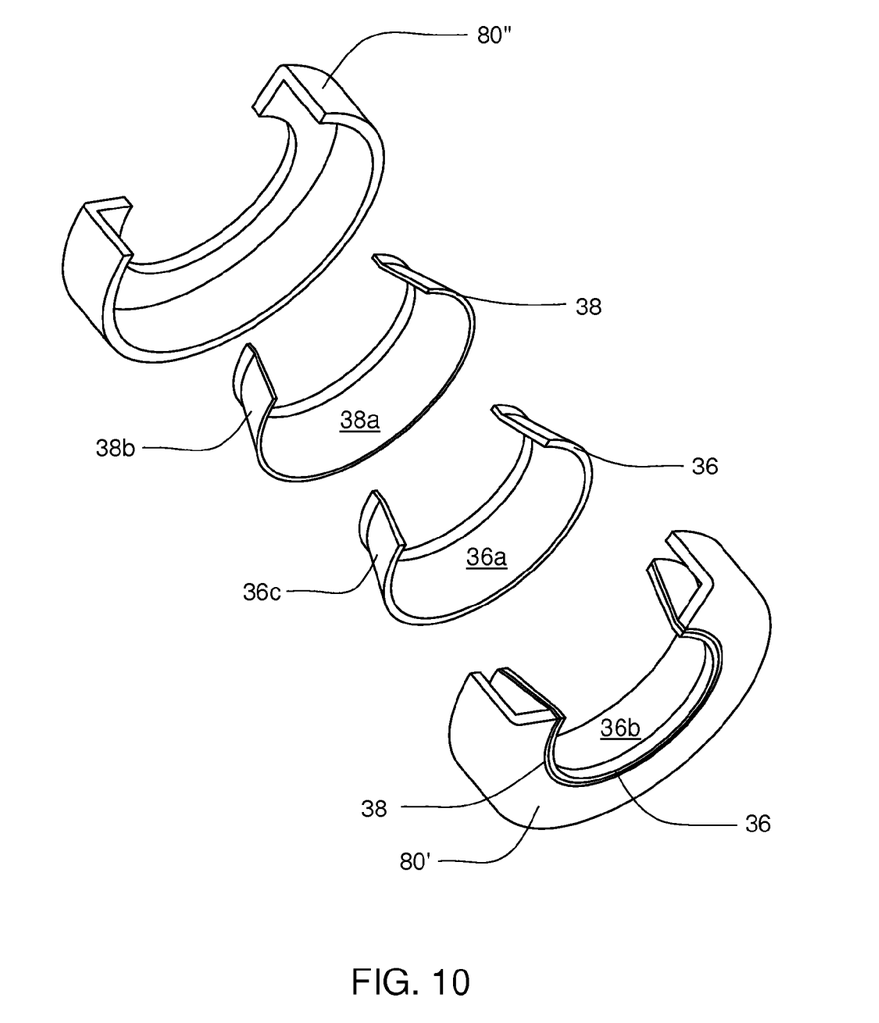
FIG. 10 is a cutaway exploded view of the embodiment shown in FIG. 9.
Figure 11:
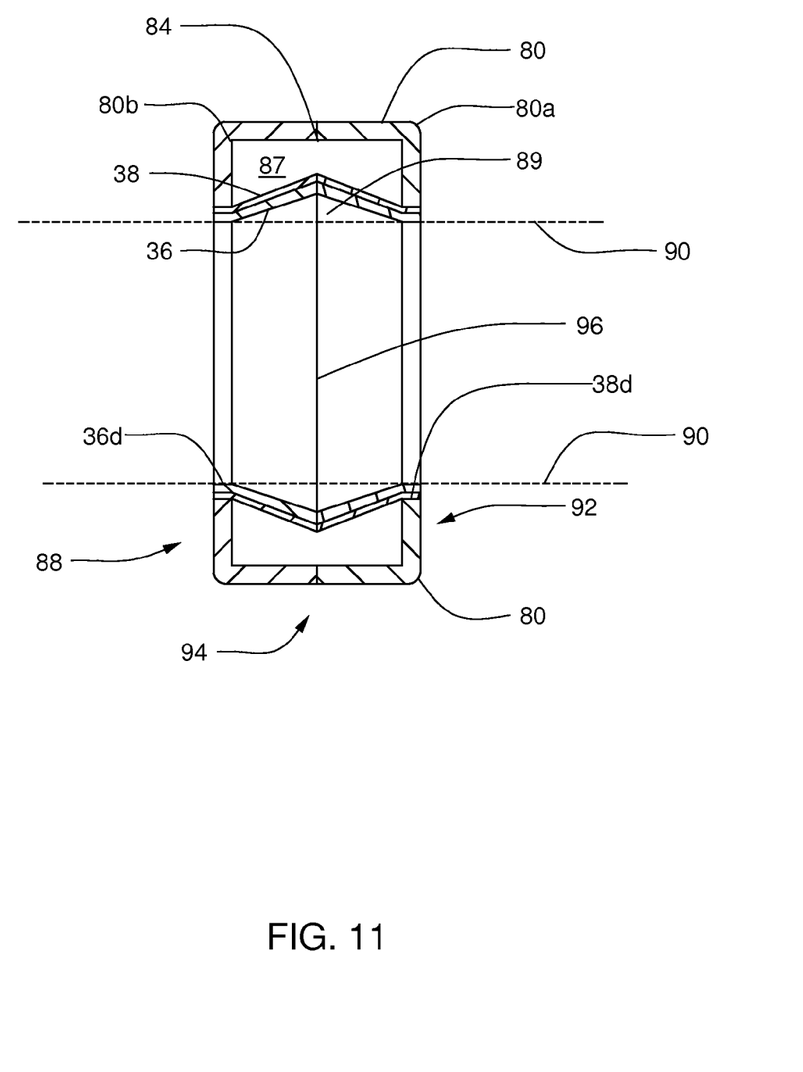
FIG. 11 is a cross-sectional diagram of the embodiment shown in FIG. 9.

Another example is provided in FIGS. 9-11 which show an assembled bearing 88 in an isometric view (FIG. 9), in cutaway exploded view (FIG. 10) and in cross-sectional view (FIG. 11). In this embodiment the cylindrical members may be in the form of V-shaped (cross-sectional profile) rings. This embodiment includes inner V-shaped ring 36 which can slidably rotate with respect to outer V-shaped ring 38. Outer V-shaped ring 38 may be permanently fixed to hollow cylindrical ring 80. In similar embodiments the inner and outer rings may include different profiles that are not specifically V-shaped. For example, the cross-sectional profile of the inner ring may be U-shaped. This profile can allow for a concave outer surface (of the inner ring) structure that results in one or more substantial bearing surfaces that are not parallel to the radial axis of the bearing. This is in contrast, for example, to the bearing shown in FIG. 7 in which the majority of the bearing surface is parallel to the radial axis of the bearing. The radius of the inner ring and/or outer ring may be greater toward the center (midline) of the bearing than it is at the lateral edges of the bearing. Moving from the outer edge to the center of the bearing, the radius may increase linearly, as in the case of a V-shaped inner ring or according to the equation of a curve in the case of a U-shaped ring. In some cases it may be only the outer surface of inner ring 36 and the inner surface of outer ring 38 that exhibit this increasing radius. For example, inner ring 36 may be formed so that it fills space 89 while maintaining a V-shaped profile on the outer surface. In this case, the inner surface of the inner ring may be parallel to the radial axis of the bearing while the outer surface is not parallel to the radial axis of the bearing.

Inner V-shaped ring 36 may be formed from a single piece or from multiple components as shown in FIG. 10. If a multi-component inner V-shaped ring is chosen, the components may remain separate or may be permanently attached together. For example, complementary halves may be joined together at central line 96 to form a unitary inner V-shaped ring. The inner V-shaped ring may he, for example, metallic or a metallic alloy and may include, for instance, steel or bronze. As seen in FIGS. 10 and 11, inner V-shaped ring 36 may include two substantially straight inner surfaces (in cross section) 36a, and 36b, that form a "V" by sloping outwardly as they meet centrally in the bearing. Inner V-shaped ring 36 may include a flattened portion 36d, at one or both of the outer edges of the ring. When inner V-shaped ring 36 receives a shaft 90 (shown in dotted lines), flattened portion 36d, may be the only portion of inner V-shaped ring 36 that is in contact with the shaft. Thus when shaft 90 is installed it may be supported by flattened portion 36d, and may form a space 89 between the surface of the shaft and the V portion of the inner surface 36a, and 36b, of the inner V-shaped ring. Space 89 can reduce heat transfer between the bearing and the shaft which can, for example, result in a cooler operating motor.

Inner surface 38A of outer V-shaped ring 38 may be complementary to outer surface 36c, of inner V-shaped ring 36. Outer V-shaped ring 38 may include outer flattened portions that correspond to flattened portions 36d, of inner V-shaped ring 36. Outer V-shaped ring 38 can be a composite and may include a fluoropolymer or other self-lubricating material on inner surface 38a, that is laminated to a metallic substrate to form the composite ring. For example, outer V-shaped ring 38 may be formed from NORGLIDE® M, SM, T, or Pro® as described above. Outer V-shaped ring 38 may be a single piece or may include two or more pieces joined together. In one embodiment, as shown, two symmetrical halves can be spot welded together. By spot welding, the joint between the two halves may form intermittent passages that allow lubricant to pass from cavity 87 to the bearing surfaces between the inner and outer V-shaped rings. In other cases the seam between the two halves may be completely sealed.

Hollow cylindrical ring 80 may form a housing for bearing 88. Hollow cylindrical ring 80 may be formed from a metallic material such as steel. Hollow cylindrical ring 80 can include two L-shaped (in cross-section) cylindrical rings that may be joined together by, for example, welding, press fitting or overmolding with a polymer. For instance, laser spot weld 84 can be seen in FIG. 9. Outer V-shaped ring 38 can be fixed to hollow cylindrical ring 80 by spot welding or other techniques. Spot welds 86a, 86b, and 86c, are evident in FIG. 9 and serve to affix hollow cylindrical ring 80 to outer V-shaped ring 38, thus immobilizing hollow cylindrical ring 80 with respect to outer V-shaped ring 38. As a result, inner V-shaped ring 36 is slidably rotatable in relation to both outer V-shaped ring 38 and hollow cylindrical ring 80. Hollow cylindrical ring 80 can be dimensioned to form cavity 87 that is a substantially toroidal shape and that extends around the outer surface 38b, of outer V-shaped ring 38. "Substantially toroidal" means that the cavity extends 360, degrees around the bearing but (as shown) it need not have a circular or even a rounded cross-section. Inclusion of this cavity has been found to reduce vibration and provide quieter operation as well as provide greater tolerance regarding the angle of the shaft that is supported by bearing 88. For example, "edge loading" that can result from a bent shaft can be more readily tolerated with the V-shape than it can with flat surfaced cylindrical bearings. The size of cavity 87 may be extended by enlarging the axial walls 92 of hollow cylindrical ring 80. Cavity 87 may be empty or may contain an additional component such as a lubricant or damping material. For example, cavity 87 may be filled, at least partially, with one of the greases or other lubricants described or referred to herein. The lubricant can be passively supplied to the bearing surfaces through passages formed in outer V-shaped bearing 38.

Hollow cylindrical ring 80 may be coated partially or totally with an elastomer to produce an elastomer coated metal. For instance, an elastomeric coating may be applied to axial surface 92 or to cylindrical surface 94, or to both. The elastomeric coating can help to provide additional vibration and noise reduction as well as provide for easier and more secure fitting of the bearing in a device. Appropriate coatings may include, for example, natural and synthetic elastomers such as PVC, PVB and NBR (nitrile rubber).

When used to rotatably support a shaft, such as a shaft of a motor or a steering mechanism, bearing 88 may be particularly tolerant of thrust loading that may cause extensive wear in alternative bearings. If an axial force is applied to the bearing through the shaft, this axial force is spread across substantially one half (the outer half) of the total contacting surfaces of the V-shaped bearing. In flanged bearings that include a substantially flat portion (in cross-section) from flange to flange, the force from the thrust loading may be applied almost entirely to the flange, resulting in excessive friction and wear at the flange location. It has been found that by spreading this force across the outer half of the V-shaped surface, rather than entirely to the flange, the frictional wear can be significantly reduced.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/arc used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

What is claimed is:

1. A bearing, comprising:
    a first member having a passageway configured to engage a shaft, the first member comprising a metallic material;
    a second member disposed around at least a portion of the first member, the second member comprising a metallic layer and a polymer layer on the metallic layer and at least one radially and inwardly bent portion capable of restricting axial movement of the first member,
    wherein the first and second members are movable relative to each other; and
    a third member disposed around at least a portion of the second member.

2. The bearing of claim 1, further comprising a lubricant between the first member and the second member.

3. The bearing of claim 2, wherein at least one of the first member or the second member comprises a cavity containing the lubricant.

4. The bearing of claim 1, wherein the second member comprises at least two radially and inwardly bent portions capable of restricting axial movement of the first member.

5. The bearing of claim 4, wherein the second member comprises two separate parts, each part comprising a radially and inwardly bent portion.

6. The bearing of claim 5, wherein the two separate parts are axially butted against each other.

7. The bearing of claim 5, wherein the two separate parts are symmetrical cup bearings.

8. The bearing of claim 4, further comprising a lubricant between the second member and the first member.

9. The bearing of the claims 8, wherein the second member includes a cavity, and at least a portion of the lubricant is capable of being in the cavity.

10. The bearing of claim 4, wherein the second member comprises a metal layer and a polymer on the metal layer, and the bearing further comprises a lubricant between the second member and the first member.

11. The bearing of claim 10 wherein the polymer is absent on a central portion of the metal layer.

12. The bearing of claim 1, wherein the second member comprises a split cylinder that has been permanently joined at the split to form a continuous cylinder.

* * * * *